United States Patent [19]

Onodera

[11] Patent Number: 5,604,014
[45] Date of Patent: Feb. 18, 1997

[54] MAGNETIC RECORDING MEDIUM AND MANUFACTURING METHOD FOR THE SAME

[75] Inventor: Katsumi Onodera, Nagano, Japan

[73] Assignee: Fuji Electric Co., Ltd., Kawasaki, Japan

[21] Appl. No.: 490,581

[22] Filed: Jun. 15, 1995

[30] Foreign Application Priority Data

Jun. 15, 1994 [JP] Japan ................................ 6-132331

[51] Int. Cl.$^6$ .................................................. G11B 5/704
[52] U.S. Cl. .................. 428/141; 428/65.3; 428/694 SG; 360/135; 427/129
[58] Field of Search ........................ 428/694 SG, 141, 428/65.3, 65.6; 360/135; 427/129

[56] References Cited

U.S. PATENT DOCUMENTS

| | | | |
|---|---|---|---|
| 5,119,258 | 6/1992 | Tsai et al. ................................ | 360/135 |
| 5,202,810 | 4/1993 | Nakamura et al. ..................... | 360/135 |
| 5,388,020 | 2/1995 | Nakamura et al. ..................... | 360/135 |

*Primary Examiner*—Stevan A. Resan
*Attorney, Agent, or Firm*—Morrison Law Firm

[57] ABSTRACT

A magnetic recording medium including a nonmagnetic base plate with textured trenches formed thereon. The resulting textured nonmagnetic base plate includes a mean line depth Rv of no more than 500 Å and a relative load length tp(90–99) of no more than 120 Å. A method for manufacturing the magnetic recording medium is also disclosed. The resulting magnetic recording medium exhibits substantially fewer micro-scratches and a reduced error frequency, due, in part, to the textured trenches formed on the nonmagnetic base plate.

5 Claims, 8 Drawing Sheets

PRIOR ART

MAGNETIC RECORDING MEDIUM AND MANUFACTURING METHOD FOR THE SAME

BACKGROUND OF THE INVENTION

The present invention relates to the configuration of a magnetic recording medium such as a magnetic disk used in the hard disk drives of computers. More particularly, the present invention is directed to the optimum parameters for texturing trenches formed on the nonmagnetic base plate and the processing of the texturing trenches.

Referring to FIG. 5, a conventional metal thin film magnetic recording medium shown generally at 10 includes a nonmagnetic Cr underlayer 2 laminated on a nonmagnetic base plate 1. A Co alloy magnetic layer 3 is laminated in a film form on the nonmagnetic Cr underlayer 2. Thereafter, a diamond like carbon protecting layer 4 is laminated on the Co alloy magnetic layer 3. The carbon protecting layer 4 contains polymer like ingredients.

Also included is a lubricating layer 5, composed of a liquid lubricant, which is disposed on the carbon protecting layer 4. The nonmagnetic base plate 1 can be composed of numerous components including one of an Al alloy, glass, carbon, titanium, or similar components. In recent years, however, Al alloy has found widespread use as the main constituent of conventional nonmagnetic base plates.

The nonmagnetic base plate 1 is covered with a Ni-P (nickel-phosphorus) plating layer 1a. Disposed thereon are texturing trenches which are formed for optimizing the floating and frictional properties of the magnetic head.

In order to keep pace with the vast improvements in data processing capabilities of conventional computers, hard disk drives with larger capacity and higher storage density are being constantly developed. Recently, a storage density of 200 Mbit/in has been reported. However, significant problems plague such conventional high storage density devices.

The prominence of the extant difficulty among conventional high density storage device is the defects on the recording surface. Indeed, defects measuring less than 1 μm on the recording surface cause substantial errors in writing-in and reading-out of data.

To avoid such defects, the prior art proposes a texturing process which includes polishing with an abrasive tape, containing coarse grained alumina, followed by polishing with a small grained alumina slurry, containing grains measuring less than 2 μm in size. However, this texturing process, results in the formation of relatively deep trenches in the circumferential direction of the disk.

Visual scars and scratches, caused by this texturing process, can be reduced by selecting a suitable abrasive exhibiting abrasive grain dispersivity. Scars can also be reduced by minimizing contact with dust.

However, significant issues remain unaddressed among prior art texturing processes. A major disadvantage of the texturing process described above is that it does not address the micro-scratches which are formed and which can cause substantial errors in writing-in and reading-out of data on the recording media with high storage density.

When the texturing process is performed with the abrasive tapes of alumina grains, a significant number of abrasive grains protruding from the tape surface remain on the base plate. These remaining abrasive grains tend to form deep scars on the base plate. The protruding abrasive grains are primarily caused by coagulation of the alumina grains. Even though the upper parts (peak side) of the deep texturing trenches can be flattened by the subsequent polishing step, the lower parts (valley side) of the deep texturing trenches remain as micro-scratches.

Longstanding problems remain to be solved by the subject matter of the present invention.

OBJECTS AND SUMMARY OF THE INVENTION

In view of the above problems, it is an object of the present invention to realize a magnetic recording medium with reduced micro-scratches and error frequency.

It is another object of the invention to provide a method for manufacturing the magnetic recording medium having fewer micro-scratches than the prior art.

Briefly, the present invention provides a magnetic recording medium composed of a nonmagnetic base plate with texturing trenches formed thereon. The textured nonmagnetic base plate has a mean line depth, Rv, indicative of the surface roughness of 500 Å or less, and a relative load length (also commonly known by one of ordinary skill in the art as a profile bearing length ratio) tp(90–99), indicative of the depth difference between 90% and 99% of the trench depth, of 120 Å or less. That is, $t_p$ (90–99) is the difference between $t_p$ at 90% and $t_p$ at 99%, and that difference, $t_p$ (90–99), is of 120 Å or less. A method for manufacturing the magnetic recording medium is also disclosed. The resulting magnetic recording medium exhibits substantially fewer micro-scratches and a reduced error frequency, due, in part, to the textured trenches formed on the nonmagnetic base plate.

According to an embodiment of the invention, there is provided a magnetic recording medium which includes a nonmagnetic base plate having at least one texturing trench formed thereon. The nonmagnetic base plate has a mean line depth Rv, of no more than 500 Å and a relative load length tp(90–99), of no more than 120 Å.

An alternative embodiment contemplates a method for manufacturing the magnetic recording medium of the present invention, which includes the steps of first polishing the nonmagnetic base plate with a diamond slurry and then performing a second polishing of the base plate with an abrasive.

The above, and other objects, features and advantages of the present invention will become apparent from the following description read in conjunction with the accompanying drawings, in which like reference numerals designate the same elements.

DETAILED DESCRIPTION OF PREFERRED EMBODIMENT

Figure 1:
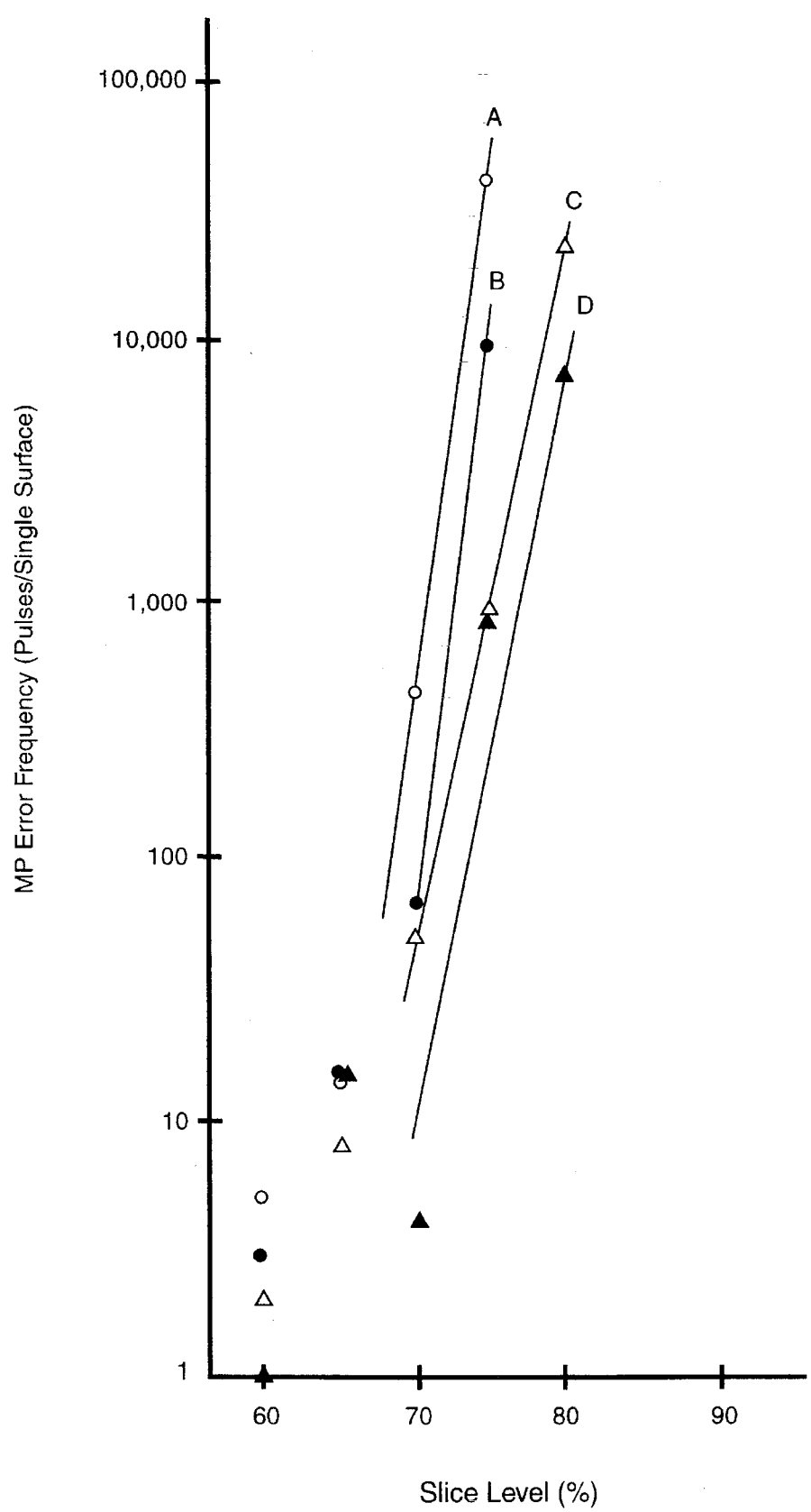
FIG. 1 is a graph showing the error avalanche curves of the magnetic recording media obtained by texturing trenches with different abrasives tapes exemplified by A, B, C and D.

The invention contemplates a magnetic recording medium, which includes a nonmagnetic base plate, formed of an Al alloy substrate. Deposited on the Al alloy substrate is a Ni-P plating layer. The nonmagnetic base plate is textured with various kinds of abrasives during a first polishing step, followed by a second polishing step which includes polishing with an alumina slurry. The alumina slurry is composed of grains having an average size of about 2 μm or less. This limitation is necessary to realize lower floating of the magnetic head over the recording medium. The nonmagnetic base plate has a mean line depth Rv of no more than 500 Å, and a relative load length tp(90–99) of no more than 120 Å. The latter is indicative of the depth difference between 90% and 99% of the trench depth, while the former is indicative of the surface roughness of the base plate at texturing. It is preferable that the mean line depth Rv be less than 300 Å and the relative load length be less than 90 Å.

An alternative embodiment contemplates a method useful for manufacturing a magnetic recording medium which includes the steps of a first polishing, wherein the base plate of the recording medium is polished with a single-crystalline diamond slurry by means of a polishing pad, followed by a second polishing which includes polishing with an abrasive.

The grain size of the diamond slurry should be no more than 3 μm. In similar fashion, the average grain size of the abrasive should not exceed 2 μm. The diamond slurry is preferably of a single-crystalline diamond slurry. The abrasive used in the abrasive polishing step is preferably an alumina slurry.

It is advantageous to use the diamond slurry because the grains in the diamond slurry rarely coagulate. Thus, using a diamond slurry containing grains measuring an average of 3 μm or less in grain size, considerably reduces the formation of deep scars. Also, the abrasive grains move more freely in the slurry than on the abrasive tape. Therefore, using a diamond slurry having grains measuring an average of about 3 μm or less considerable reduces the number of deep scars formed on the base plate.

This, in turn, facilitates obtaining a magnetic recording medium which shows a mean line depth Rv, indicative of the surface roughness of the base plate at texturing, of 500 Å or less, and a relative load length tp(90–99), indicative of the depth difference between the 90% and 99% of the trench depth distribution density, of 120 Å or less. Such a magnetic recording medium is preferred because it exhibits substantially fewer micro-scratches and a lower error frequency.

The single-crystalline diamond abrasives have less polyhedral corners and angular abrasives than the poly-crystalline diamond abrasives. Therefore, the single-crystalline diamond slurry facilitates sharp polishing without the occurrence of flash. As such, it is well suited for optimizing the floating and frictional properties of the magnetic head.

The present invention is explained hereinafter with reference to the accompanying drawings which illustrate the various embodiments contemplated by the inventor.

Referring to FIG. 1, a graph showing the error avalanche curves of the magnetic recording media obtained by texturing with different abrasive tapes during a first polishing step, A, B, C and D, the axis of abscissa represents the slice level in percentage (%) with respect to the maximum value (100%) in the wave heights of the reproduced signals.

The axis of ordinate of FIG. 1 represents the frequency of errors by the missing pulses (MP) from a single recording surface. In the measurements, a magnetic head with the gap length of 0.3 μm and with storage density of 46 kFCI is floated 0.07 μm above a storage disk rotating at the line speed of 9.5 m/sec with respect to the magnetic head.

The grain size is set at the same value throughout the abrasive tapes A, B, C and D, while their binders and grain dispersivity are varied. The MP error frequency for the abrasive tape D is the minimum among the abrasive tapes.

The MP error frequency for abrasive tape D at the slice level of 80% is 7000 pulses. As can be seen from FIG. 1, even though the abrasive tape D shows the lowest MP error frequency among the abrasive tapes examined, other prominent errors abound, which are caused by abrasive tape D.

Figure 2:
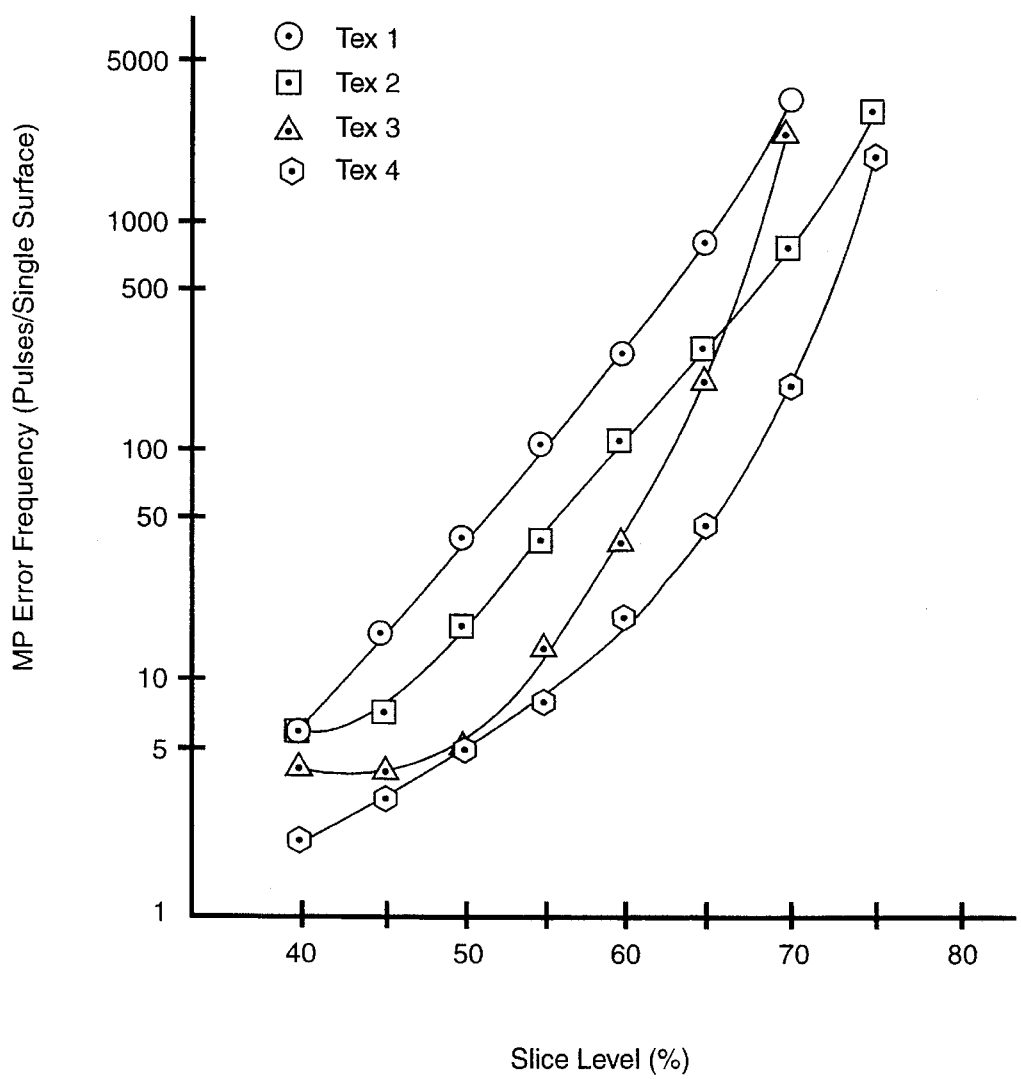
FIG. 2A is a graph showing the error avalanche curves of the magnetic recording media textured with an abrasive in accordance with the methods listed in Table 1.

FIG. 2 is a graph showing the error avalanche curves of the magnetic recording media textured, during a first polishing step, with abrasives listed in Table 1 together with the methods also listed in Table 1.

TABLE 1

| No. | Abrasive | Polishing method | Roughness (Ra) |
|---|---|---|---|
| Tex. 1 | Abrasive tape B (2 μm) | Tape texturing | Ra 70Å |
| Tex. 2 | Abrasive tape C (2 μm) | Tape texturing | Ra 50Å |
| Tex. 3 | White alumina slurry (3 μm) | Slurry method | Ra 65Å |
| Tex. 4 | Single-crystalline diamond slurry (3 μm) | Slurry Method | Ra 65Å |

Tex 1 and the Tex 2 are similar to abrasive tapes B and C of FIG. 1. The magnetic head used for the measurements is an MR head with gap length of 0.3 μm with a storage density of 60 kFCI, floating about 0.1 μm above the storage disk.

It is evident from FIG. 2, that Tex 2 (textured trench), which has an Ra value less than that of the Tex 1 and is thus finer in texture, exhibits a lower error frequency than Tex 1. Note however, that a very low Ra value has its disadvantages. Indeed, a very low Ra value (roughness) has been implicated in imparting poor frictional property to the magnetic medium. In contrast, the base plates, textured with one of white alumina slurry or the diamond slurry, wherein the latter includes a grain size of no more than 3 μm, exhibits lower error frequencies than that of the tape-textured base plates. This is thought to be due to the abrasive grains which are more mobile in the slurries. Since the abrasive grains are estimated to move more freely in the slurry, the abrasive grains do not press upon the base plate surface even while the abrasive grains are pressed under the polishing pad, thus resulting in fewer deep scars.

The single-crystalline diamond slurry provides lower error frequency values than the white alumina slurry. This may be due to the fact that single crystals are less angular than poly crystals. Indeed, the single-crystalline diamond slurry enables sharp polishing such that the flash may not be caused, and therefore, is preferable to optimize the floating and frictional properties of the magnetic head. Since the mean roughness Ra is 65 Å for the base plate textured with the single-crystalline diamond slurry, a satisfactory frictional property is obtained simultaneously.

Figure 3A:
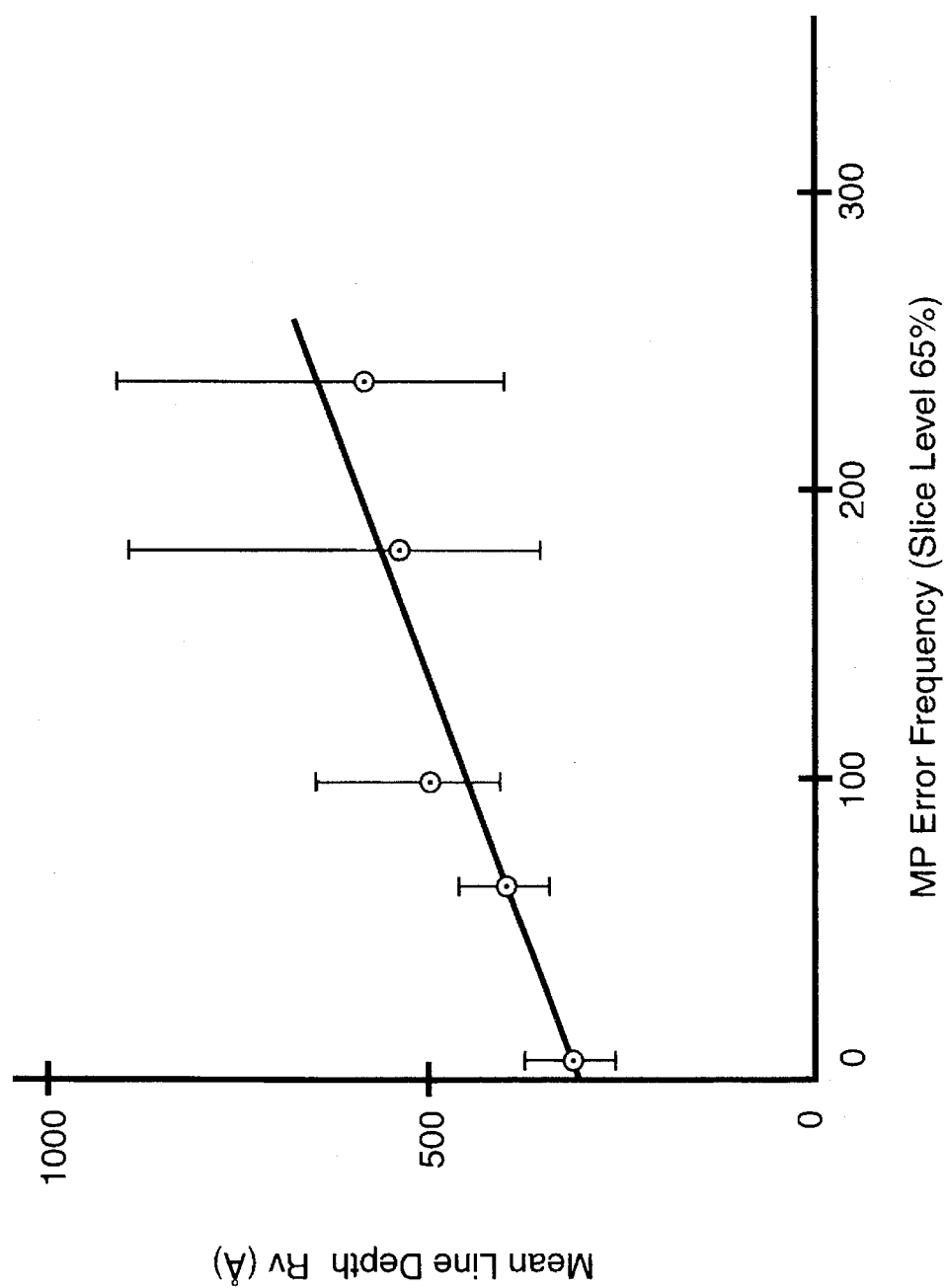
FIG. 3(a) is a graph showing the relation between the mean line depth Rv and the missing pulses (MP) error frequency for the texturing trenches under various conditions with a single-crystalline diamond slurry composed of grains measuring no more than 3 μm in diameter.

Referring to FIG. 3(a), a graph showing the relation between the mean line depth Rv and the MP error frequency for the texturing under various conditions with the single-crystalline diamond slurry is shown. Note that the average grain size of the diamond slurry is about 3 μm.

Figure 3B:
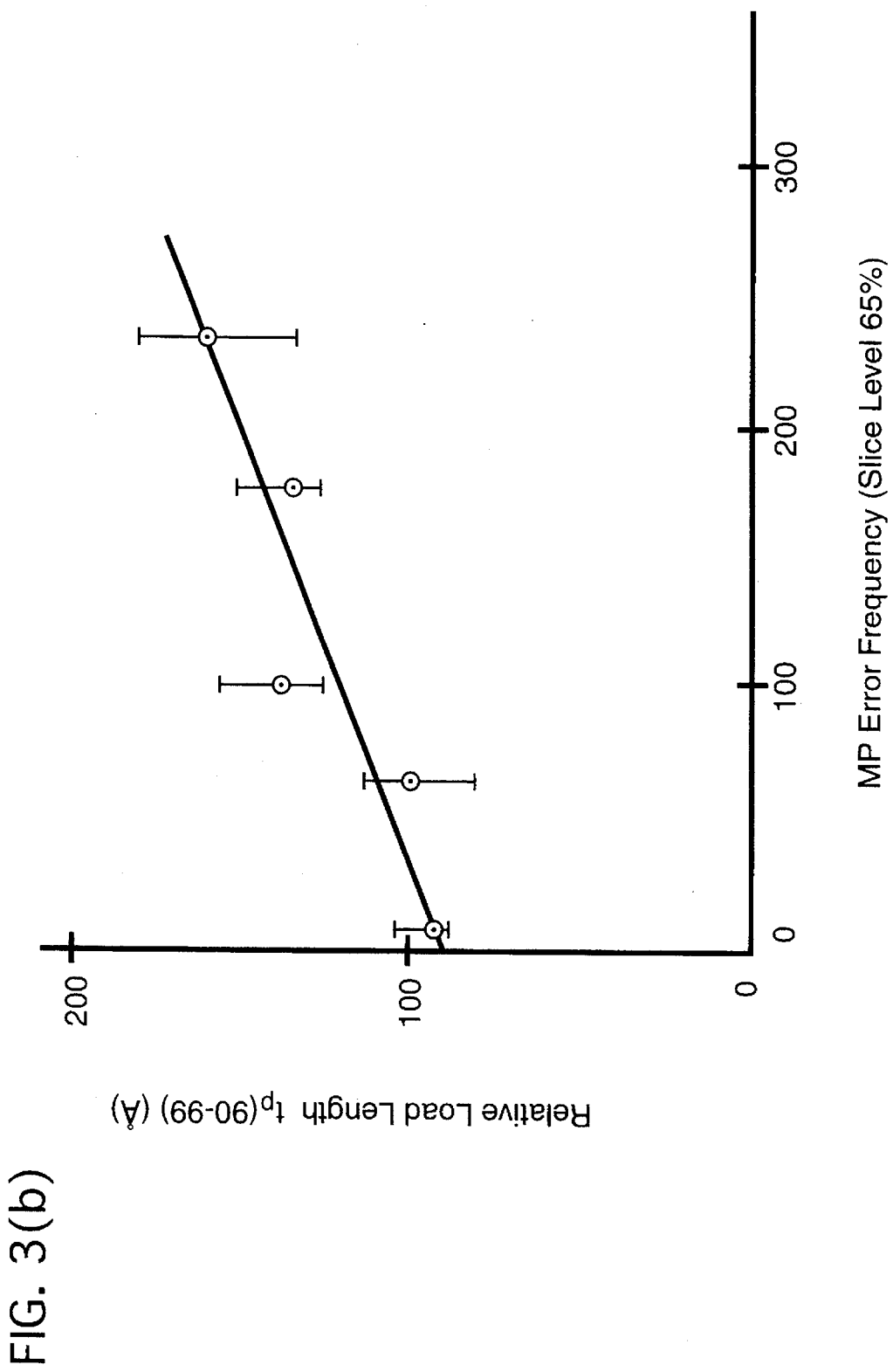
FIG. 3(b) is a graph showing the relation between the relative load length tp(90–99) and the MP error frequency for the texturing under various conditions with a single-crystalline diamond slurry having grains measuring no more than 3 μm in diameter.

FIG. 3(b) is a graph showing the relation between the relative load length (also commonly known by one of ordinary skill in the art as a profile bearing length ratio) tp(90–99) and the MP error frequency for texturing under various conditions with the single-crystalline diamond slurry wherein the average grain size is no more than 3 μm.

Figure 4A:
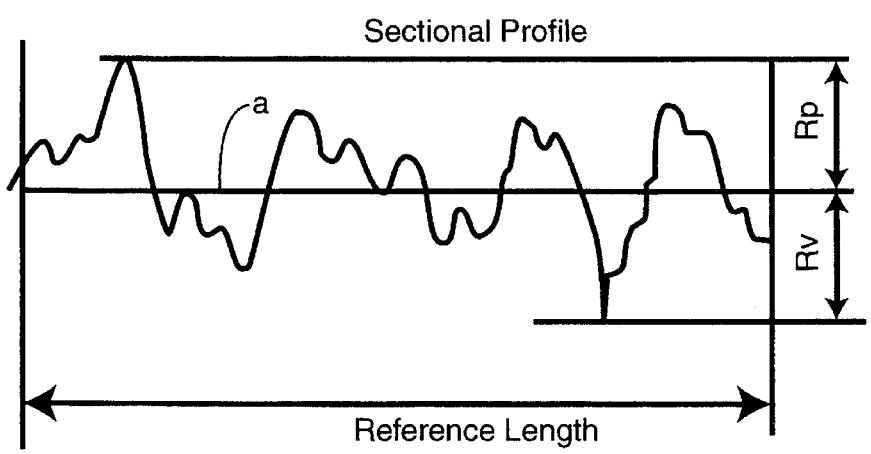
FIGS. 4(a), 4(b), and 4(c) are schematic graphs explaining the mean line depth Rv and the relative load length tp(90–99).

The Ra value was measured in a roughness meter model ET-30K purchased from Kosaka Laboratories (Japan). The roughness meter is characterized as having a probe needle measuring about 0.5 μm in diameter. The mean line depth Rv represents the maximum depth of a sectional profile, without being cut off, below the mean line (a) as shown in FIG. 4(a).

Figure 4B:
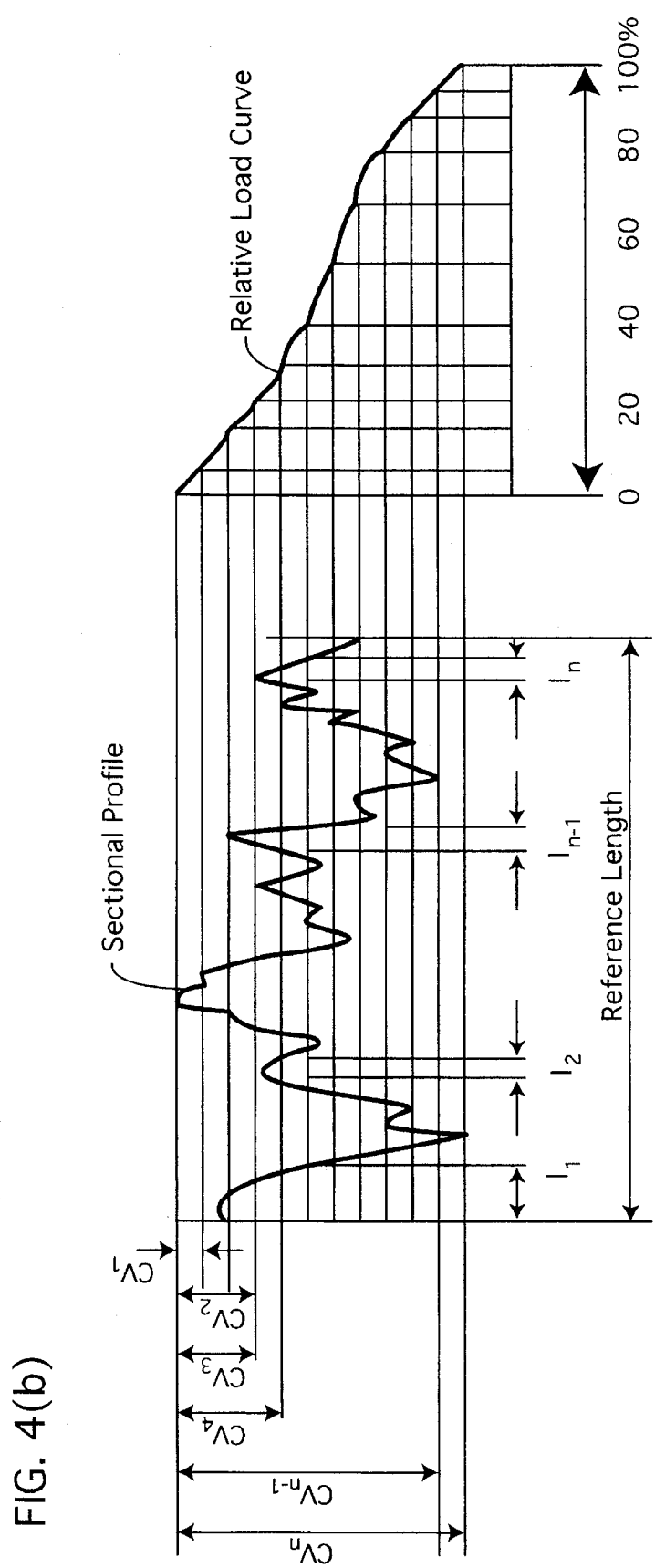
Figure 4C:
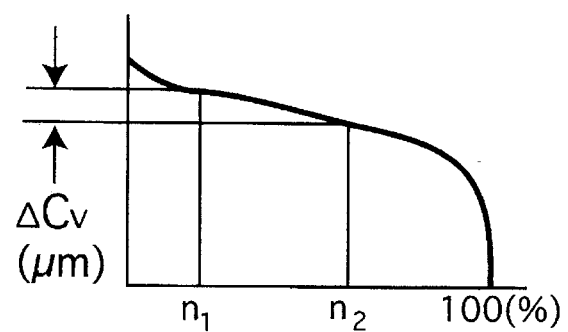
Figure 5:
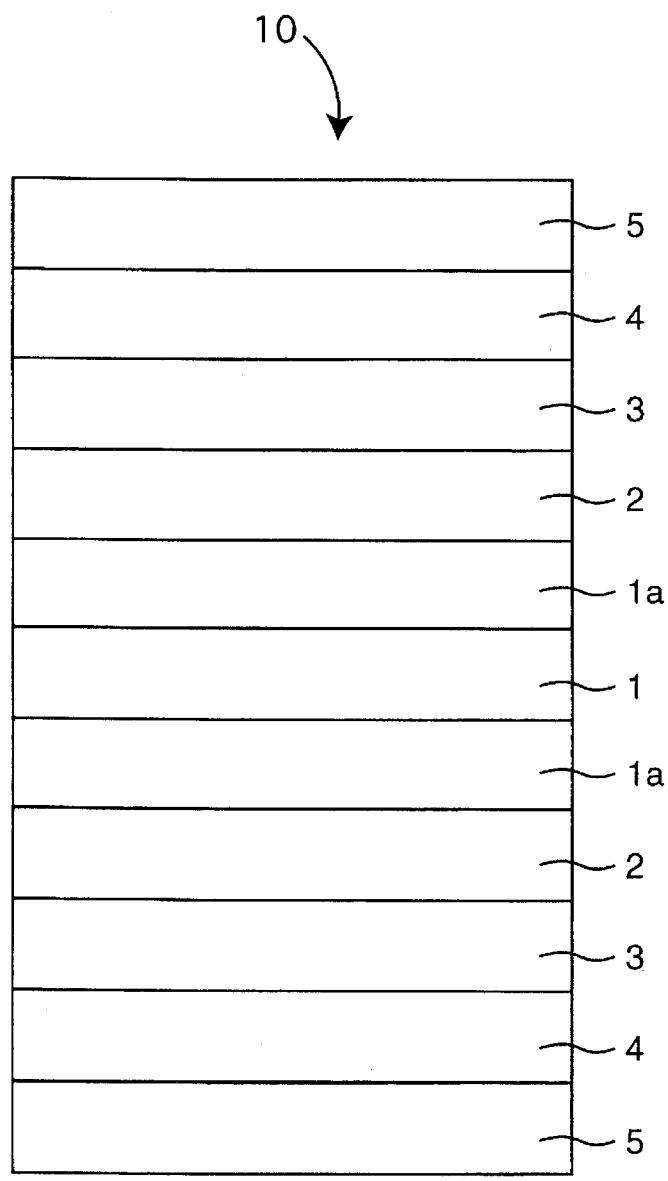
FIG. 5 is a schematic sectional view of the conventional metal thin film magnetic recording medium.

The relative load length tp(90–99) is calculated initially by obtaining a relative load curve (also commonly known by one of ordinary skill in the art as a curve of the profile bearing length ratio) indicative of the density distribution of cutting depth CVs, the 100% of which is the maximum length from the bottom of the deepest valley to the top of the highest peak as shown in FIG. 4(b). Thereafter, the cutting depth difference (δCv) in (μm) between n1=90% and n2=99% as shown in FIG. 4(c) is obtained.

Referring again to FIGS. 3(a) and 3(b), the error frequency is proportional respectively to the mean line depth Rv and the relative load length tp(90–99). This lends credence to the assertion that the error frequency is effectively reduced if the texturing trenches are uniformly formed, meaning that the texturing trenches are neither very deep nor anomalous.

In order to be reliable, a magnetic recording media should have an error frequency of no more than 100 pulses. Thus, it is preferable to suppress the mean line depth Rv at 500 Å or less. Likewise, it is desirable that the relative load length tp(90–99) be no more than 120 Å. That is, $t_p$ (90–99) is the difference between $t_p$ at 90% and $t_p$ at 99%, and that difference, $t_p$(90–99), is of 120 Å or less.

The above described magnetic recording medium is obtained by a texturing process wherein a on-magnetic base plate is texturing with a single-crystalline diamond slurry followed by a second polishing with an alumina slurry.

Having described preferred embodiments of the present invention with reference to the accompanying drawings, it is to be understood that the present invention is not limited to the precise embodiments and that various changes and modifications may be affected therein by one skilled in the art without departing from the scope or spirit of the present invention which is limited only by the appended claims.

What is claimed is:

1. A magnetic recording medium comprising:

a nonmagnetic base plate having at least one texturing trench formed thereon;

said nonmagnetic base plate having a mean line depth Rv, of no more than 500 Å; and said nonmagnetic base plate having a relative load length tp(90–99), of no more than 120 Å.

2. The magnetic recording medium according to claim 1, wherein said nonmagnetic base plate is composed of an Al alloy.

3. A method for manufacturing the magnetic recording medium according to claim 1, comprising the steps of:

providing a nonmagnetic base plate;

polishing said nonmagnetic base plate with a diamond slurry; and further polishing said polished base plate with an abrasive.

4. The method as claimed in claim 3, wherein said diamond slurry further comprises a single-crystalline diamond slurry.

5. The method as claimed in claim 3, wherein said abrasive includes an alumina slurry.

* * * * *